US011022757B1

(12) United States Patent
Zhang et al.

(10) Patent No.: US 11,022,757 B1
(45) Date of Patent: Jun. 1, 2021

(54) USING AN ANTI-REFLECTION COATING WITH A GRATING COUPLER

(71) Applicant: Cisco Technology, Inc., San Jose, CA (US)

(72) Inventors: Xunyuan Zhang, Breinigsville, PA (US); Shiyi Chen, Breinigsville, PA (US); Tao Ling, Breinigsville, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/696,957

(22) Filed: Nov. 26, 2019

(51) Int. Cl.
| | |
|---|---|
| *G02B 6/34* | (2006.01) |
| *G02B 6/136* | (2006.01) |
| *G01M 11/00* | (2006.01) |
| *G02B 6/12* | (2006.01) |
| *G02B 1/113* | (2015.01) |

(52) U.S. Cl.
CPC ............ *G02B 6/34* (2013.01); *G02B 6/136* (2013.01); *G01M 11/33* (2013.01); *G02B 1/113* (2013.01); *G02B 2006/12107* (2013.01); *G02B 2006/12147* (2013.01)

(58) Field of Classification Search
CPC .......... G02B 6/34; G02B 6/136; G02B 6/113; G02B 2006/12107; G02B 2006/12147; G01M 11/33
See application file for complete search history.

(56) References Cited

U.S. PATENT DOCUMENTS

| | | | |
|---|---|---|---|
| 7,184,625 B2 | 2/2007 | Gunn, III et al. | |
| 7,460,742 B2 | 12/2008 | Joyner | |
| 7,576,361 B2 * | 8/2009 | Agranov | H01L 27/1462 257/66 |
| 9,435,961 B2 * | 9/2016 | Jiang | G02B 6/1223 |
| 9,910,232 B2 * | 3/2018 | Mekis | G02B 6/428 |
| 9,971,099 B2 | 5/2018 | Tokushima et al. | |
| 10,146,020 B1 * | 12/2018 | Yasumura | G02B 6/4206 |
| 10,209,442 B2 * | 2/2019 | Menezo | G02B 6/4214 |
| 10,459,163 B2 * | 10/2019 | Menezo | G02B 6/30 |

(Continued)

OTHER PUBLICATIONS

Tokushima, M. & Ushida, J. Anti-phase reflection coating maximizing the directionality of grating couplers. Optics Express24(10), 11075 (2016).

(Continued)

*Primary Examiner* — Ryan A Lepisto
(74) *Attorney, Agent, or Firm* — Patterson + Sheridan, LLP (57) ABSTRACT

Embodiments herein describe a photonic platform where an AR coating is disposed between an optical grating and a semiconductor substrate. In one embodiment, the optical grating is disposed within an insulative layer. A first side of the insulative layer provides an optical interface where an external optical source can transmit an optical signal into, or a receive an optical signal from, the grating. A second, opposite side of the insulative layer contacts the AR coating. When the external optical source transmits light through the first side of the insulative layer, some of the light passes through the grating and reaches the AR coating. The AR coating prevents this light from being reflected back to the grating by the semiconductor layer which can cause interference that varies the coupling efficiency of the grating.

20 Claims, 5 Drawing Sheets

(56) References Cited

U.S. PATENT DOCUMENTS

| | | | |
|---|---|---|---|
| 2005/0063636 A1 | 3/2005 | Joyner | |
| 2006/0214251 A1 | 9/2006 | Ratnam et al. | |
| 2014/0050441 A1* | 2/2014 | Wakabayashi | G02B 6/0016 385/37 |
| 2018/0008118 A1 | 1/2018 | Pleschinger et al. | |
| 2018/0081118 A1 | 3/2018 | Klamkin et al. | |
| 2018/0335566 A1* | 11/2018 | Menezo | G02B 6/4214 |

OTHER PUBLICATIONS

Huijuan Zhang, Chao Li, Xiaoguang Tu, Junfeng Song, Haifeng Zhou, Xianshu Luo, Ying Huang, Mingbin Yu, and G. Q. Lo, "Efficient silicon nitride grating coupler with distributed Bragg reflectors", Opt. Express 22, 21800-21805.

Jinghui Zou, Yu Yu, Mengyuan Ye, Lei Liu, Shupeng Deng, and Xinliang Zhang, "Ultra efficient silicon nitride grating coupler with bottom grating reflector" Opt. Express 23, 26305-26312 (2015).

Wissem Sfar Zaoui, Maria Félix Rosa, Wolfgang Vogel, Manfred Berroth, Jörg Butschke, and Florian Letzkus, "Cost-effective CMOS-compatible grating couplers with backside metal mirror and 69% coupling efficiency" Opt. Express 20, B238-B243 (2012).

Refractive Index of AlN, Aluminium Nitride [Accessed Online Nov. 26, 2019] https://www.filmetrics.com/refractive-index-database/AlN/Aluminium-Nitride.

Lacava et al., "Si-rich Silicon Nitride for Nonlinear Signal Processing Applications," Scientic Reports, Feb. 2, 2017, 13 pages.

\* cited by examiner

USING AN ANTI-REFLECTION COATING WITH A GRATING COUPLER

TECHNICAL FIELD

Embodiments presented in this disclosure generally relate to grating couplers used to receive an optical signal from an external source, and more specifically, to reducing reflections using an anti-reflection (AR) coating.

BACKGROUND

Grating couplers (referred to simply as gratings) are often used as interfaces between waveguides within a photonic chip (e.g., a silicon photonic platform) and an external light source—e.g., a fiber optic cable. That is, gratings can be used to transmit light into, and out of, the photonic chip. However, the coupling efficiency of a grating can vary widely based on variations in fabrication processes. Put differently, slight variations in the fabrication process can result in dramatic changes to the efficiency of the grating. However, tightly controlling the fabrication process so that the efficiency of the grating is predictable may be difficult or impossible.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a photonic platform that includes a semiconductor substrate, an insulative layer disposed on the semiconductor substrate, a grating coupled to a waveguide, wherein the grating and the waveguide are embedded in the insulative layer, and an AR coating disposed at an interface between the insulative layer and the semiconductor substrate. Moreover, the AR coating is aligned with the grating such that light introduced into the photonic platform passes through the grating and is incident on the AR coating.

Another embodiment described herein is a method that includes forming an AR coating on a semiconductor substrate of a handler wafer, covering the AR coating with a first insulator, and bonding the handler wafer to a photonic wafer where the photonic wafer comprises a grating that is aligned with the AR coating in the handler wafer after bonding.

Another embodiment described herein is a photonic platform that includes a semiconductor substrate, an insulative layer disposed on the semiconductor substrate, a grating coupled to a waveguide, wherein the grating and the waveguide are embedded in the insulative layer, and an AR coating disposed between the insulative layer and the semiconductor substrate where at least a portion of the AR coating is directly beneath the grating.

Example Embodiments

Embodiments herein describe a photonic platform where an AR coating is disposed between a grating and a semiconductor substrate. In one embodiment, the grating is disposed (or embedded) within an insulative layer. A first side of the insulative layer (e.g., a top side) provides an optical interface where an external optical source can transmit an optical signal into, or a receive an optical signal from, the grating. A second, opposite side of the insulative layer (e.g., a bottom side) contacts the semiconductor substrate. When the external optical source transmits light through the top side of the insulative layer, some of the light passes through the grating and reflects off the semiconductor substrate back towards the grating. This reflected light creates optical interference at the grating. Moreover, the amount of light that is reflected by the semiconductor substrate depends on the separation distance between the grating and the semiconductor substrate, which in turn is highly dependent on the fabrication process used to manufacture the photonic platform. Put differently, variations in the fabrication process can change the amount of light reflected by the semiconductor substrate which in turn directly affects the coupling efficiency of the grating.

To mitigate or remove the impact of fabrication variations on the coupling efficiency of the grating, embodiments herein describe using the AR coating to minimize reflections caused by the semiconductor substrate. In one embodiment, the AR coating is disposed at an interface between the bottom side of the insulative layer and the semiconductor substrate. The material and dimensions of the AR coating are selected so that light passing through the grating first passes through the AR coating and then into the semiconductor substrate without being reflected by the semiconductor substrate. In this manner, regardless of the separation distance between the grating and the semiconductor substrate, the AR coating suppresses reflections that can negatively impact the coupling efficiency of the grating.

Figure 1:
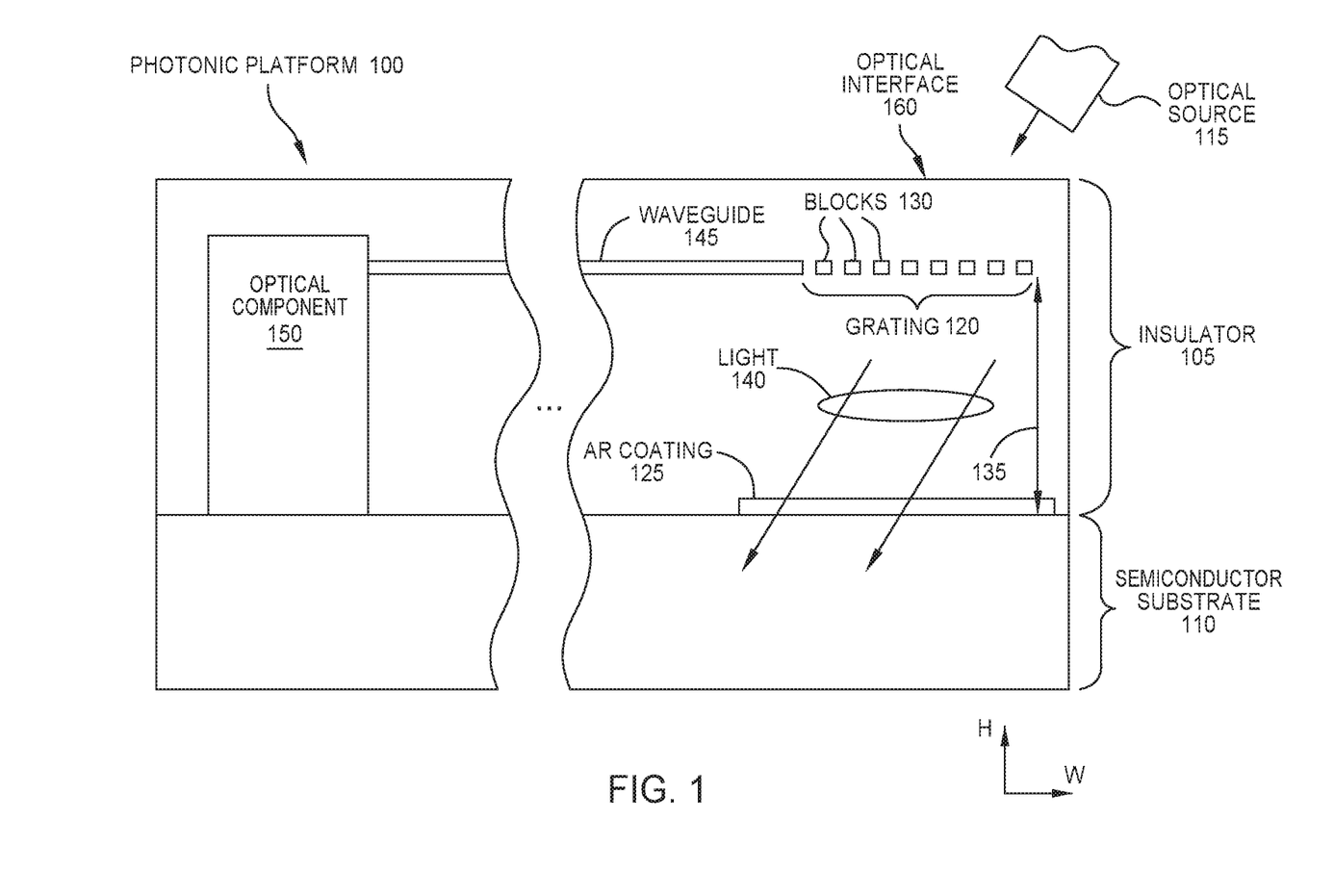
FIG. 1 illustrates an AR coating disposed between a grating and a semiconductor substrate, according to one embodiment described herein.

FIG. 1 illustrates an AR coating 125 disposed between a grating 120 and a semiconductor substrate 110, according to one embodiment described herein. FIG. 1 illustrates a photonic platform 100 that is optically coupled to an optical source 115. That is, the photonic platform 100 includes an optical interface 160 through which an optical signal (i.e., light) can be transmitted between the grating 120 and the optical source 115. In one embodiment, the optical source 115 transmits an optical signal through the optical interface 160 to the grating 120. While in other embodiments the grating 120 can be used to transmit an optical signal to the optical source 115 via the optical interface 160, the embodiments herein describe embodiments where the optical source 115 (e.g., an optical fiber, optical probe, or laser) transmits light into the photonic platform 100 that is then received by the grating 120.

In one embodiment, the optical source 115 and the grating 120 are part of a wafer level optical testing of the photonic platform 100 that determines whether platform 100 functions as intended. That is, the source 115 and grating 120 may be used as part of a wafer acceptance test during fabrication. Using the external optical source 115 and the grating 120 when testing the photonic platform 100 may be preferred since optically coupling the optical source 115 to the grating 120 can be performed without other optical coupling techniques such as deep trench etching and wafer dicing. However, the embodiments herein are not limited to using the grating 120 when testing. In other embodiments, the grating 120 may be used during normal operation of the photonic platform 100.

As shown, the optical source 115 is angled relative to the optical interface 160 so that light is introduced into the optical interface 160 at an angle (e.g., 5-30 degrees offset from a direction that is perpendicular to the optical interface 160), although this is not a requirement. In any case, the light reaches the grating 120 which includes a plurality of blocks 130 separated by a pitch and surrounded by the material of the insulator 105. For example, the width (W) of each block 130 may range from 200-300 nm with a pitch of 500-600 nm. The height (H) of the blocks 130 may be less than 1 micron. Moreover, the blocks 130 are not limited to a cubic or rectangular shape as shown by the cross section in FIG. 1. In some embodiments, the blocks 130 can have curved sides.

The grating 120 redirects light received from the optical source 115 into the waveguide 145 (e.g., a sub-micron waveguide). The light then propagates through the waveguide 145 until reaching an optical component 150 (e.g., a modulator, detector, optical splitter, etc.). The embodiments herein are not limited to any particular type of optical component 150 and can be used in any photonic platform that includes a grating 120 disposed on an underlying semiconductor substrate 110.

The amount of light that is captured by the grating 120 and then transmitted into the waveguide 145 defines the coupling efficiency of the grating 120. As discussed above, the coupling efficiency of the grating 120 can be varied due to reflections. FIG. 1 illustrates that some of the light 140 emitted by the optical source 115 passes through the grating 120 without being redirected into the waveguide 145. This light propagates through the insulator 105 (e.g., an insulative layer) in which the grating 120 and waveguide 145 are disposed (or embedded). The light 140 eventually reaches the AR coating 125 which is disposed at the interface between the insulator 105 and the semiconductor substrate 110. As shown, the AR coating 125 is disposed in a facing relationship with a first side of the grating 120 that is opposite a second side of the grating 120 in a facing relationship with the optical interface 160.

The AR coating 125 causes the light 140 to pass through the semiconductor substrate 110 without reflecting off of a top side of the substrate 110. Stated differently, without the AR coating 125 the insulator 105 and the semiconductor substrate 110 would directly contact, and instead of passing into the semiconductor substrate 110, much of the light would be reflected in a direction back towards the grating 120 due to the differences in the refractive index of the materials. This reflected light can interfere with the light transmitted from the optical source 115 and varies the coupling efficiency of the grating 120. Also, as described in more detail below, the variation of the height (or distance 135) of the insulator 105 between the grating 120 and the semiconductor substrate 110 has a direct impact on the coupling efficiency of the grating 120. The distance 135 may be approximately 0.5-12 microns, but due to process variation, can vary by as much as 10-15%.

Adding the AR coating 125 ensures that the light 140 that is not coupled into the grating 120 does not reflect back to interfere with the coupled light. As a result, the variation of the distance 135 between the grating 120 and the substrate 110 has little or no impact on the efficiency of the grating 120. That is, the fabrication process used to control the distance 135 can vary without changing the coupling efficiency of the grating 120. As such, adding the AR coating 125 can reduce the complexity and cost of the fabrication process since the distance 135 does not need to be tightly controlled in order to ensure a desired coupling efficiency of the grating 120 (i.e., the coupling efficiency is more predictable).

The AR coating 125 can be made from any material that results in the light 140 passing through the semiconductor substrate 110 rather than being reflected. The material of the AR coating 125 can vary depending on several factors such as the wavelength of the light 140, the material of the insulator 105 (and its refractive index), and the material of the semiconductor substrate 110 (and its refractive index). As an example, assume the light 140 has a wavelength of 1310 nm. If the insulator 105 is silicon oxide and the semiconductor substrate 110 is crystalline silicon, then the AR coating 125 can be aluminum nitride or a silicon rich silicon nitride ($SiN_x$, x<1.33). In one embodiment, the optical refractive index of the AR coating 125 is the square root of the refractive index of the insulator 105 multiplies the square root of the refractive index of the semiconductor substrate 110. Using the refractive indexes of silicon oxide and silicon, the optical refractive index of the AR coating 125 in that example is approximately 2.24. Aluminum nitride has a refractive index of 2.2 while the nitrogen/silicon ratio in silicon rich silicon nitride can be controlled to result in a refractive index that varies from 2.0 to 2.7. In one embodiment, a silicon rich silicon nitride AR coating 125 can be formed using a precursor for silicon and nitride and varying the flow rate to vary the nitrogen/silicon ratio to achieve the optimal 2.24 refractive index.

Again assuming the wavelength of the light 140 is 1310 nm, the optimal thickness of the AR coating 125 is 146 nm. However, the optimal thickness changes as the wavelength of the light 140 changes and as the optimal refractive index of the coating 125 changes. That is, if the material of the insulator 105 or the semiconductor substrate 110 is different from silicon oxide and crystalline silicon, the material of the AR coating 125 and its thickness may also change to ensure the light 140 is not reflected by the semiconductor substrate 110. Thus, the embodiments herein are not limited to silicon oxide as the insulator 105 and could be another silicon type insulative material such as silicon nitride or silicon oxynitride, or any other insulative material that is a suitable cladding for the grating 120 and the waveguide 145. Further, the semiconductor substrate 110 is not limited to silicon and can be a different semiconductor (e.g., a III-V crystalline semiconductor). The material and thickness of the AR coating 125 can then be selected based on the refractive indexes of these materials to ensure the light 140 is not reflected by the material of the semiconductor substrate 110.

The material of the waveguide 145 and the grating 120 can vary. For example, in one embodiment, the waveguide 145 and the grating 120 may be formed from silicon; however, any suitable wave guiding material can be used. In one embodiment, the material of the waveguide 145 and the grating 120 may be the same (e.g., crystalline silicon). However, in another embodiment, the material of the grating 120 may be different than the material of the semiconductor substrate 110. For example, the grating 120 may be made from silicon while the substrate 110 is a III-V material or vice versa. This type of difference between the material of the grating 120 and the substrate 110 is compatible with the method of fabricating the photonic platform 100 that is described below in FIG. 4-6. Because in those embodiments the grating 120 and the substrate 110 are formed on different wafers, it is easier to form these structures from different materials, relative to a fabrication process where they are formed on the same wafer.

Figure 2:
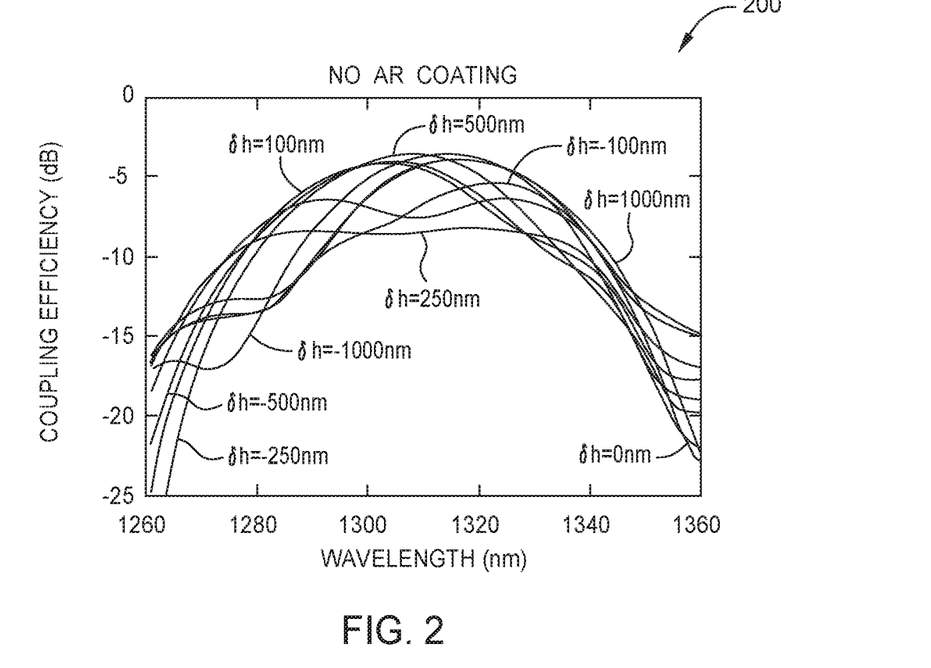
FIG. 2 is a chart illustrating the effect of fabrication variation on the efficiency of a grating without an AR coating, according to one embodiment described herein.

FIG. 2 is a chart 200 illustrating the effect of fabrication variation on the efficiency of a grating without an AR coating, according to one embodiment described herein. The Y-axis of the chart 200 measures the coupling efficiency of the grating 120 when there is no AR coating 125 disposed at the interface between the insulator 105 and the semiconductor substrate 110 in FIG. 1. The X-axis is the wavelengths of the optical signal being coupled into the grating.

The various plots in the chart 200 illustrate different variations from a desired separation distance between the grating and the underlying semiconductor substrate. That is, each plot has a different value of the distance 135 illustrated in FIG. 1. These values represent the delta or variation in the separation distance from a desired (or optimal) separation distance resulting from variations in the fabrication process. For example, the desired separation distance may be 9 microns where the plots illustrate 100-1000 nm variations from this desired separation distance which result in large fluctuations of the coupling efficiency of the grating. Because these fabrications variations are often unpredictable, chart 200 illustrates that the coupling efficiency is also unpredictable—i.e., can vary widely.

Figure 3:
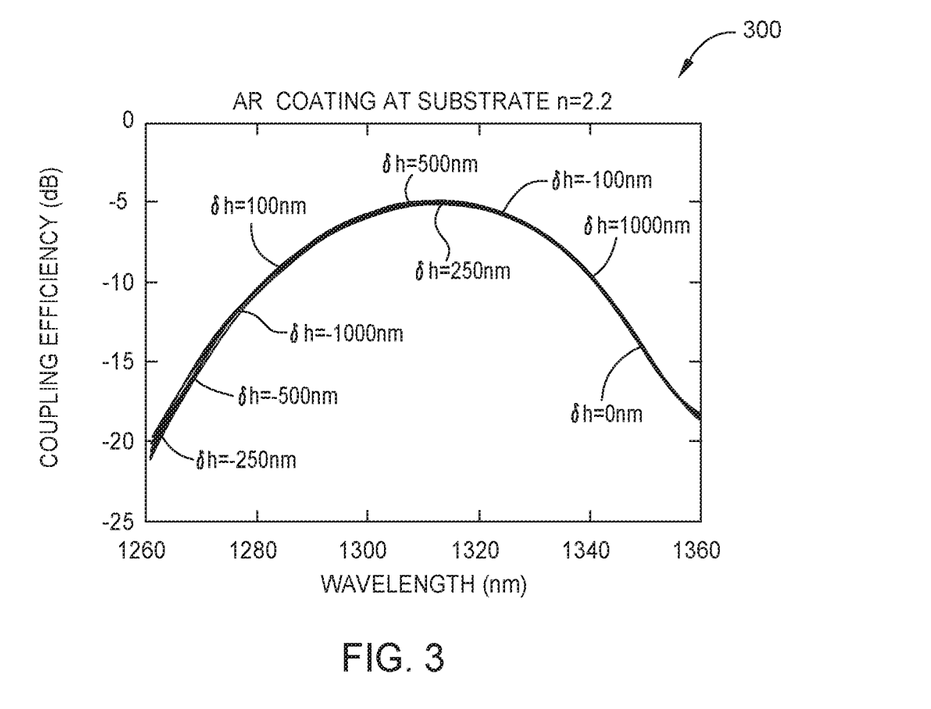
FIG. 3 is a chart illustrating the effect of fabrication variation on the efficiency of a grating with an AR coating, according to one embodiment described herein.

FIG. 3 is a chart 300 illustrating the effect of fabrication variation on the efficiency of a grating with an AR coating, according to one embodiment described herein. The plots in the chart 300 illustrate the same variations in the desired separation distance as shown in chart 200. However, the plots in the chart 300 are for a photonic platform that includes the AR coating 125 disposed at the interface between the insulator containing the grating 120 and the semiconductor substrate 110 as shown in FIG. 1.

The plots in the chart 300 substantially overlap each other and change uniformly with respect to wavelength. As such, once the wavelength of the light is known, the coupling efficiency of the grating is predictable. That is, although the separation distance between the grating and the underlying semiconductor substrate can vary widely (e.g., +/−1000 nm) during the fabrication process, this has little to no effect on the coupling efficiency. Thus, the coupling efficiency remains predictable despite variations in the fabrication process.

Figure 4:
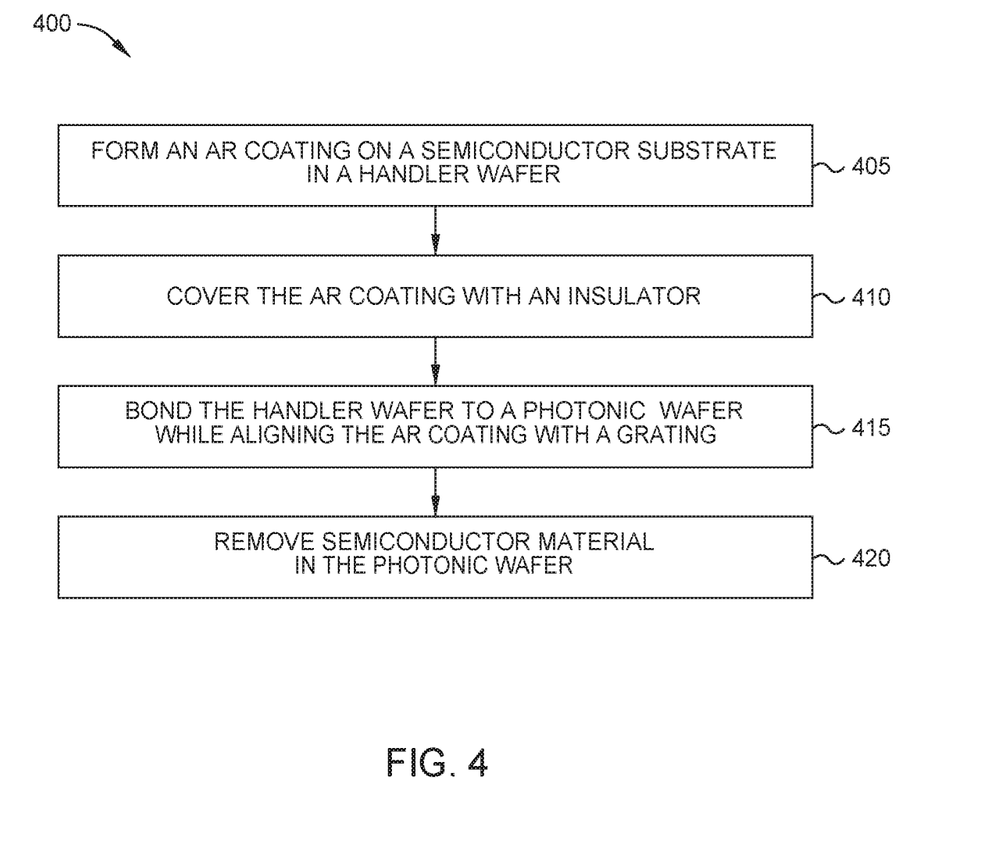
FIG. 4 is a flowchart for forming an AR coating for improving the coupling efficiency of a grating, according to one embodiment described herein.

FIG. 4 is a flowchart of a method 400 for forming an AR coating for improving the coupling efficiency of a grating, according to one embodiment described herein. For clarity, the blocks in the method 400 are discussed in tandem with FIGS. 5A-5C and 6A-6B.

Figure 5A:
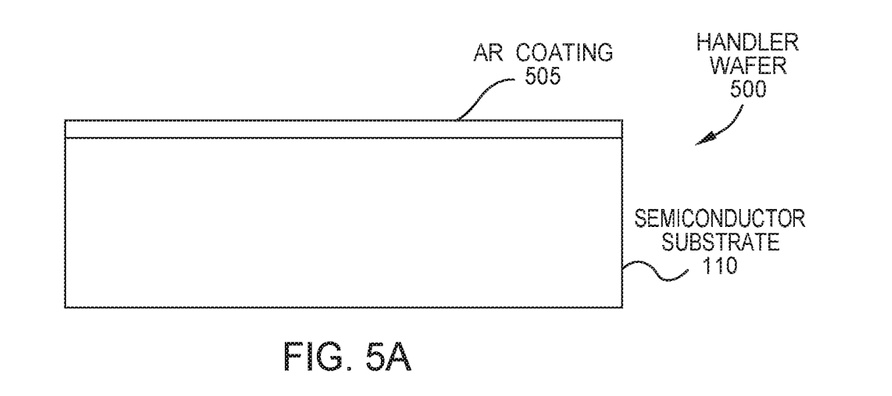
FIGS. 5A-5C illustrate forming an AR coating on a handler wafer, according to one embodiment described herein.

At block 405, an AR coating is formed on a semiconductor substrate in a handler wafer. FIG. 5A illustrates a handler wafer 500 with a semiconductor substrate 110. The substrate 110 can be any of the materials discussed above (e.g., silicon or a III-V semiconductor). An AR coating 505 is formed on the substrate 110 using a deposition process. The type of process using to form the AR coating 505 can depend on the material of the AR coating 505. As discussed above, in one embodiment, the material and the thickness of the AR coating 505 depends on the material of the semiconductor substrate 110, the material of the insulator formed above the AR coating 505, and the waveguide of the light used in the photonic platform.

Figure 5B:
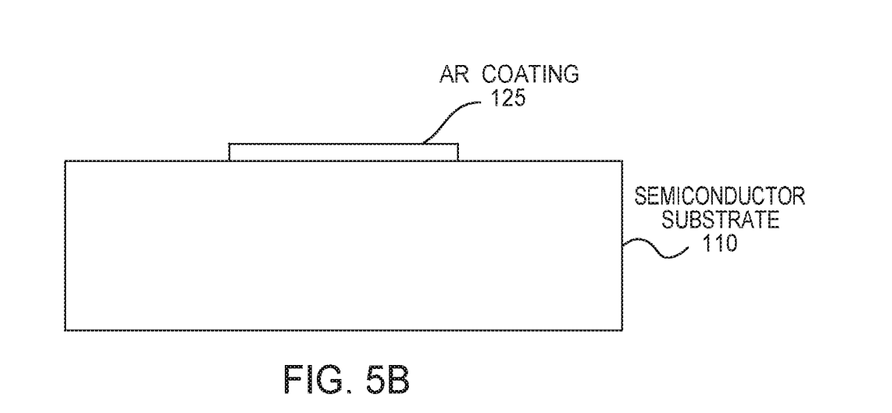

FIG. 5B illustrates patterning the AR coating 505 to form the AR coating 125. That is, while the AR coating 505 may be disposed over the entire semiconductor substrate 110, in this embodiment the portions of the AR coating 505 that do not align with the grating (which is discussed and illustrated in later figures) are removed from the substrate 110. For example, the AR coating 505 may have a width that is equal to or greater than the width of the grating. In one embodiment, because the light may pass through the grating at an angle, the width of the AR coating 125 may extend past the grating. For example, the width of the AR coating may extend past the grating by ten microns on one or both sides of the grating. Put differently, the AR coating 125 may be centered with the grating 120, but may have a width that extends 10-20 microns beyond the width of the grating 120 so that light entering the grating at an angle (e.g., when emitted by an angled optical source) still reaches the AR coating 125, and thus, is not reflected by the underlying semiconductor substrate 110. In another embodiment, the grating 120 and the AR coating 125 are not centered. In that case, the center of the AR coating 125 may be shifted to the left or the right of the center of the grating 120 depending on the angle at which the light enters the photonic platform.

Figure 5C:
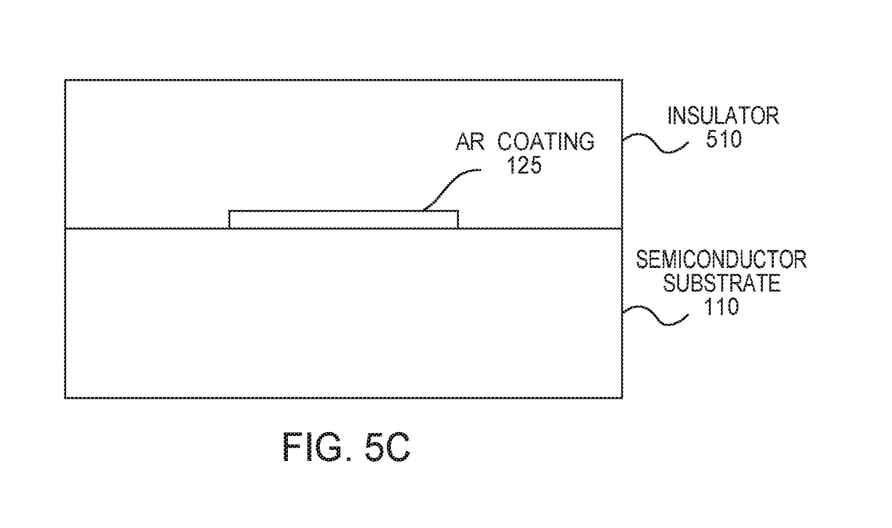

At block 410, the AR coating is covered with an insulator. FIG. 5C illustrates covering or embedding the AR coating 125 with an insulator 510. As discussed below, the top surface of the insulator 510 provides a wafer bonding surface for bonding the handler wafer to a photonic wafer that includes the grating.

At block 415, the handler wafer is bonded to a photonic wafer while aligning the AR coating with the grating. Aligning the AR coating with the grating means that these two components are arranged such that when the grating is aligned with an external optical source, light passing through the grating is incident on the AR coating. In one embodiment, at least a portion of the AR coating is directly below the grating, but this might not be the case if the distance between the AR coating and the grating is large or the angle at which the optical source transmits light into the photonic platform is large (relative to a direction normal to the optical interface).

Figure 6A:
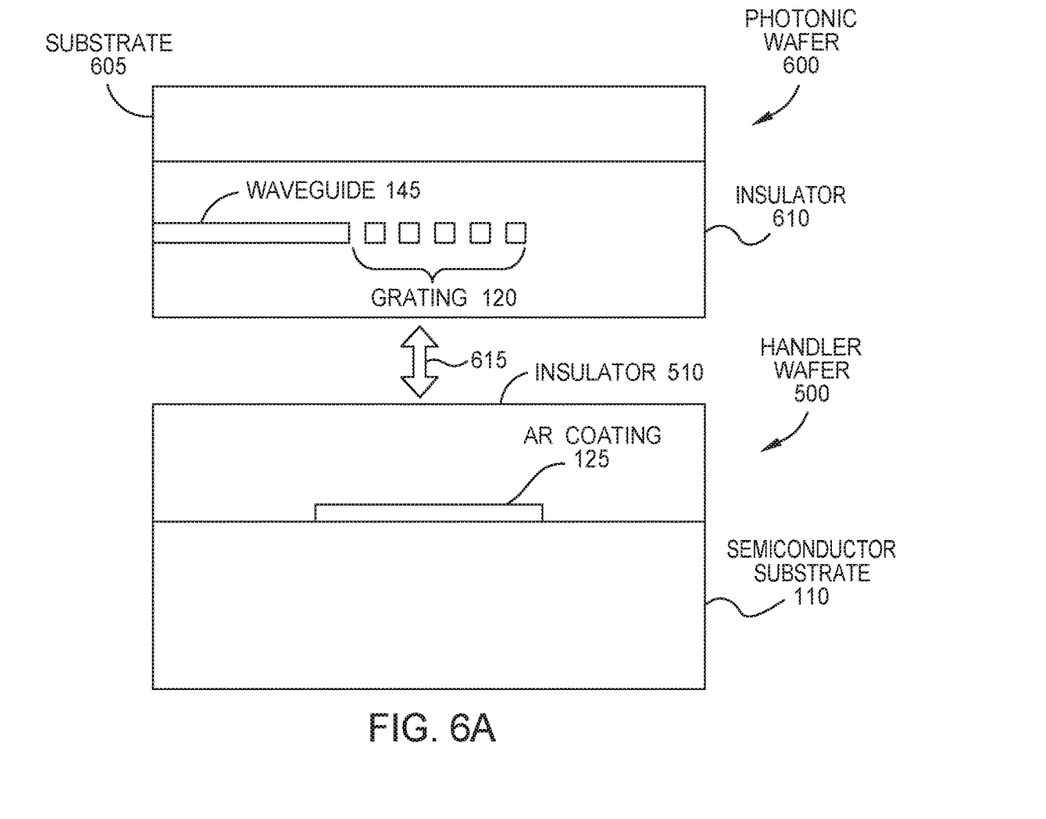
FIGS. 6A and 6B illustrate bonding the handler wafer to a photonic chip containing a grating, according to one embodiment described herein.

The bonding process is illustrated in FIG. 6A. There, a photonic wafer 600 is bonded to the handler wafer 500. Specifically, the insulator 510 is bonded to a corresponding insulator 610 in the photonic wafer 600 as shown by the arrow 615.

Although not shown, the photonic wafer 600 was previously processed to include the waveguide 145 and the grating 120 embedded in the insulator 610. For example, the wafer 600 may have started as a silicon-on-insulator (SOI) wafer which was processed to form the waveguide 145, the grating 120, and any of the other optical components discussed above. The SOI wafer is then processed to form the photonic wafer 600 where the insulator 610 is exposed. The substrate 605 (e.g., a semiconductor substrate) is then used as support for bonding the photonic wafer 600 to the handler wafer 500.

When bonding, the wafers 500, 600 are aligned such that the AR coating 125 is aligned with the grating 120. In one embodiment, the alignment varies depending on the separation distance between the grating 120 and the AR coating 125. For example, if the angle at which the light enters the grating 120 has a small offset (e.g., less than 5-10 degrees from the direction perpendicular to the optical interface 160 in FIG. 1) and the separation distance is small, then grating 120 and the AR coating 125 may generally overlap, although the width of the AR coating 125 may extend beyond the width of the grating 120. However, if the angle of the light is larger and/or the separation distance is greater, then the overlap between the AR coating 125 and the grating 120 may be less, or they may have no overlap. In any case, the AR coating 125 and the grating 120 are aligned during wafer bonding so that light passing through the grating 120 first reaches the AR coating 125 before reaching the semiconductor substrate 110 to minimize or eliminate reflections from the substrate 110.

The insulators 610, 510 can be any material that permits wafer bonding. In one embodiment, the insulator 610 in the photonic wafer 600 and the insulator 510 in the handler wafer 500 are the same material (e.g., silicon oxide, silicon nitride, or silicon oxy-nitride).

Figure 6B:
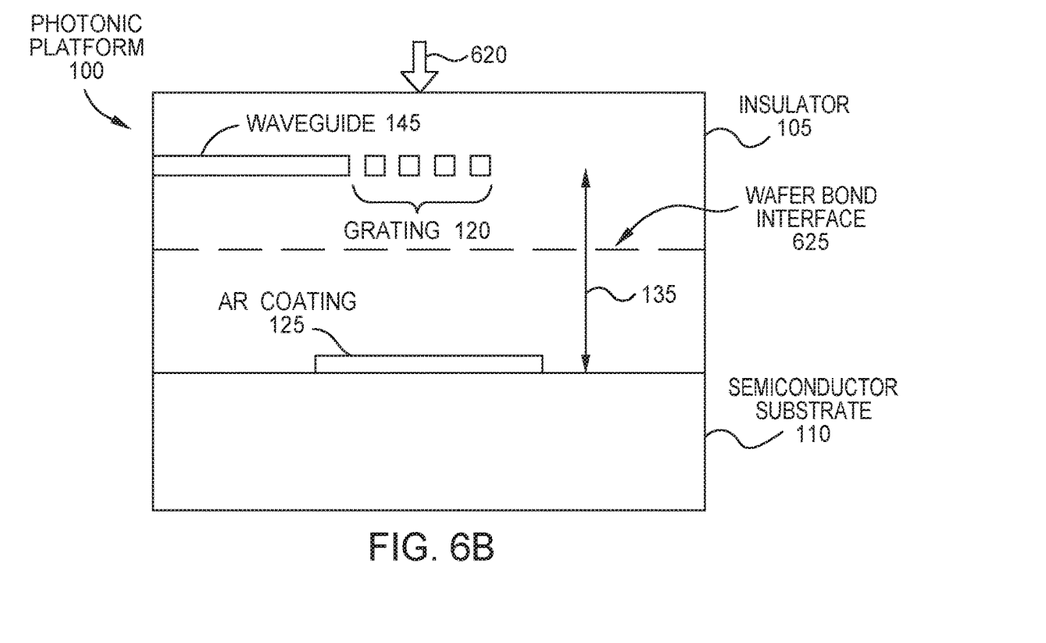

FIG. 6B illustrates the photonic platform 100 which results from bonding the handler wafer 500 and the photonic wafer 600 illustrated in FIG. 6A. A wafer bond interface 625 or bonding line (shown as a dotted line) represents the location where the insulators 510, 610 were bonded to form the insulator 105. That is, using wafer bonding, the insulators 510, 610 are bonded together to form a uniform insulative layer illustrated by the insulator 105 (assuming the insulators 510, 610 are the same insulative material).

FIG. 6B illustrates that the thickness of the insulator 610 and the insulator 510 determine the separation distance between the grating 120 and the semiconductor substrate—i.e., the distance 135. The fabrication process (or processes) used to form the insulators 510 and 610 are examples of process that can vary as discussed above, thereby resulting in the grating 120 having an unpredictable coupling efficiency as shown in chart 200. That is, the deposition process used to form the insulators 510 and 610 may have a thickness variation of +/−10%. In one embodiment, this variation is due to multiple layer deposition and the flip-chip bonding process illustrated in FIGS. 6A and 6B. However, adding the AR coating 125 eliminates or mitigates the unpredictable impact this variation has on the coupling efficiency of the grating 120, thereby providing uniform performance across wafers (or batches) that is not sensitive to fabrication process variation. Moreover, the grating/AR coating configurations described herein are compatible with the flip-chip wafer bonding process. Further, the selected materials can be compatible with CMOS industry thereby reducing cost and improving the yield of fabricating the photonic platform 100 relative to using materials not commonly used in the CMOS industry.

At block 420, the semiconductor substrate of the photonic wafer is removed to expose the insulator containing the grating. An example of this process step is illustrated in FIG. 6B by the arrow 620 where the substrate 605 of the photonic wafer 600 has been removed, thereby exposing a top surface of the insulator 105. In one embodiment, the top surface serves as the optical interface 160 shown in FIG. 1. That is, an external optical source can be aligned with the top surface of the insulator 105 so that light transmitted by the optical source is incident on the grating 120 and is coupled into the waveguide 145.

Removing the substrate 605 of the wafer 600 can be performed by any mechanical or chemical means. For example, chemical mechanical polishing (CMP), reactive ion etching (RIE), or wafer grinding can be used to remove the substrate 605 and expose the top surface of the insulator 105.

Although not discussed in method 400, the handler wafer and the photonic wafer may include multiple AR coatings and multiple gratings which are aligned (in pairs) during the bonding process. The combined, bonded wafer may then be diced to form multiple photonic platforms 100. That is, the method 400 can be used to form multiple individual photonic platforms 100 (e.g., multiple dies for transceivers).

In one embodiment, before dicing the combined wafer, the gratings are used to test the individual photonic platforms. That is, multiple optical probes can be aligned with the top surface of the insulator 105 so that they are optically coupled to the gratings. The optical signals transmitted by the optical probes are then coupled, via the gratings 120, into the waveguides 145 and can be used to test respective optical components in the photonic platforms. In this manner, a manufacturer can identify the functioning (and non-functioning) photonic platforms in the combined wafer before it is diced. The wafer can then be diced.

The functioning photonic platforms are integrated into an optical device (e.g., a transceiver) while the non-functioning photonic platforms are discarded or recycled. In one embodiment, it may reduce costs and improve yield to test the photonic platforms using the gratings when the photonic platforms are still part of a combined wafer in contrast to testing the photonic platforms when they have already been separated and placed in individual packages.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:
1. A photonic platform, comprising:
a semiconductor substrate;
an insulative layer disposed on the semiconductor substrate;
a waveguide disposed in the insulative layer;
a grating embedded in the insulative layer, the grating configured to:

direct a first portion of light introduced into the photonic platform into the waveguide; and pass a second portion of light introduced into the photonic platform towards the semiconductor substrate; and an anti-reflection (AR) coating disposed at an interface of the insulative layer and the semiconductor substrate, wherein the AR coating is aligned with the grating such that the second portion of light passes through the AR coating before reaching the semiconductor substrate.

2. The photonic platform of claim 1, wherein the AR coating reduces reflections caused by the semiconductor substrate.

3. The photonic platform of claim 1, wherein at least a portion of the AR coating is disposed directly beneath the grating along an axis that is perpendicular to the insulative layer.

4. The photonic platform of claim 1, wherein the grating comprises a plurality of blocks that are separated by a pitch, wherein each block is surrounded by a material of the insulative layer.

5. The photonic platform of claim 1, wherein a distance between the grating and the AR coating is between 0.5-12 microns.

6. The photonic platform of claim 1, wherein the AR coating is disposed in a facing relationship with a first side of the grating that is opposite a second side of the grating in a facing relationship with a surface of the photonic platform that provides an optical interface for receiving the light.

7. The photonic platform of claim 1, wherein the AR coating directly contacts the semiconductor substrate and the insulative layer.

8. The photonic platform of claim 1, wherein the semiconductor substrate comprises crystalline silicon, the insulative layer comprises a silicon type insulative material, and the AR coating comprises one of: aluminum nitride or a silicon rich silicon nitride.

9. A method, comprising:
forming an AR coating on a semiconductor substrate of a handler wafer;
covering the AR coating with a first insulator; and
bonding the handler wafer to a photonic wafer, wherein the photonic wafer comprises a grating that is aligned with the AR coating in the handler wafer after bonding.

10. The method of claim 9, further comprising:
etching a semiconductor substrate of the photonic wafer after bonding the handler wafer to the photonic wafer to expose a surface of the first insulator.

11. The method of claim 10, further comprising:
aligning an external optical source to the exposed surface of the first insulator; and
transmitting light from the external optical source to the grating, wherein a first portion of the light passes through the grating and is incident on the AR coating.

12. The method of claim 11, wherein the photonic wafer comprises an optical component coupled to the grating via a waveguide, further comprising:
coupling a second portion the light into the waveguide using the grating; and
testing the optical component using the second portion of the light.

13. The method of claim 9, wherein the grating is embedded in a second insulator, wherein the first insulator of the handler wafer is directly bonded to the second insulator of the photonic wafer.

14. The method of claim 13, wherein the first insulator and the second insulator comprise a same material.

15. A photonic platform, comprising:
a semiconductor substrate;
an insulative layer disposed on the semiconductor substrate;
a waveguide disposed in the insulative layer;
a grating embedded in the insulative layer, the grating configured to:
direct a first portion of light introduced into the photonic platform into the waveguide; and
pass a second portion of light introduced into the photonic platform towards the semiconductor substrate; and
an AR coating disposed at an interface of the insulative layer and the semiconductor substrate, wherein at least a portion of the AR coating is directly beneath the grating such that the second portion of light passes through the AR coating before reaching the semiconductor substrate.

16. The photonic platform of claim 15, wherein the AR coating comprises a material that reduces reflections.

17. The photonic platform of claim 15, wherein both the portion of the AR coating and the grating are disposed along an axis that is perpendicular to the insulative layer.

18. The photonic platform of claim 15, wherein the grating comprises a plurality of blocks that are separated by a pitch, wherein each block is surrounded by a material of the insulative layer.

19. The photonic platform of claim 15, wherein thicknesses of the grating and the waveguide are less than a micron.

20. The photonic platform of claim 15, wherein a width of the AR coating is greater than or equal to a width of the grating.

* * * * *